April 16, 1963 M. ROMAN 3,085,425
MILK SAMPLING AND TESTING APPARATUS
Filed Dec. 21, 1959

INVENTOR.
Michael Roman
ATTORNEY.

United States Patent Office 3,085,425
Patented Apr. 16, 1963

3,085,425
MILK SAMPLING AND TESTING APPARATUS
Michael Roman, 18 Eugene St., Lowville, N.Y.
Filed Dec. 21, 1959, Ser. No. 860,993
3 Claims. (Cl. 73—61)

This invention relates to an improved apparatus for sampling, warming and sediment testing of previously filtered milk, and more especially for sampling milk which has been collected and refrigerated in commonly used farm bulk milk cooling tanks, in order to determine the degree of cleanliness or acceptability of the milk for consumer use.

The apparatus is of such nature as to facilitate the taking of a milk sample to be tested rapidly, the sample being withdrawn by vacuum from the supply to be tested. The sample is then sufficiently warmed to such a temperature as may be found necessary to overcome cream cover-up or masking of the sediment testing material. Thereafter the sample is filtered by means of vacuum through relatively dense sediment testing material.

The degree of cleanliness of bulk milk supplies is commonly referred to in terms of milligrams of sediment found present in a specific volume of milk when filtered through sediment testing material of a specific area, for example, the filtering of a one gallon sample of stirred milk through a sediment testing disc having a filter area of 1⅛ inches in diameter. The milligrams of sediment is determined by comparing the resulting sediment test disc of the milk sample tested with photographs or specially prepared sediment test standard discs known to contain varying amounts of sediment expressed in terms of milligrams.

In the sampling and testing of refrigerated milk for sediment content, it is necessary to warm the milk sample sufficiently so as to overcome the tendency of the cream to cover-up or mask the resulting sediment test disc. Furthermore, it has been found that unless refrigerated milk is warmed, the cream in the cold milk tends to clog the passage of the milk through the dense sediment testing material. Also, due to the density of the sediment testing material, the application of a pressure greater than gravity is necessary to effect passage of the milk through such testing material. For these reasons, the invention embodies means for obtaining the desired volume sample for testing from the body of the bulk milk supply, means for warming the sample before any of the refrigerated milk comes in contact with the sediment test disc and means for providing a pressure greater than atmospheric to accomplish passage of milk through the sediment testing material.

The invention is adapted for use by producers, milk purchasers, sanitarians and others desiring to test such refrigerated milk in order to determine its degree of cleanliness. It has been found that should the original filtration of the milk by the producer be ineffective, much of the sediment in the filtered milk collected in large farm cooling tanks tends to settle to the bottom of the tank. In order to demonstrate dramatically an unsatisfactory condition, the invention makes it possible to sweep the bottom of a tank of unagitated milk during the sample procurement by use of vacuum.

With the above explanation in mind, it is the general object of this invention to provide an apparatus wherein is incorporated means for procuring and holding a predetermined volume of refrigerated milk, means for warming the procured sample before it comes in contact with the sediment testing material and means for vacuum filtration of the warmed milk sample through sediment testing material.

A further object of this invention is to provide an apparatus which is compact, easily cleaned and well adapted for the above described purposes.

The foregoing and other features of the invention will now be described in connection with the accompanying drawings forming a part of this specification in which is illustrated the invention in preferred form. It is expressly understood that the drawings are employed for illustrative purposes only, and are not designed as a definition of the limits of the invention, reference being had for this purpose to the appended claims.

In the drawings wherein like reference characters indicate like parts:

Figures 1, 2, 3:
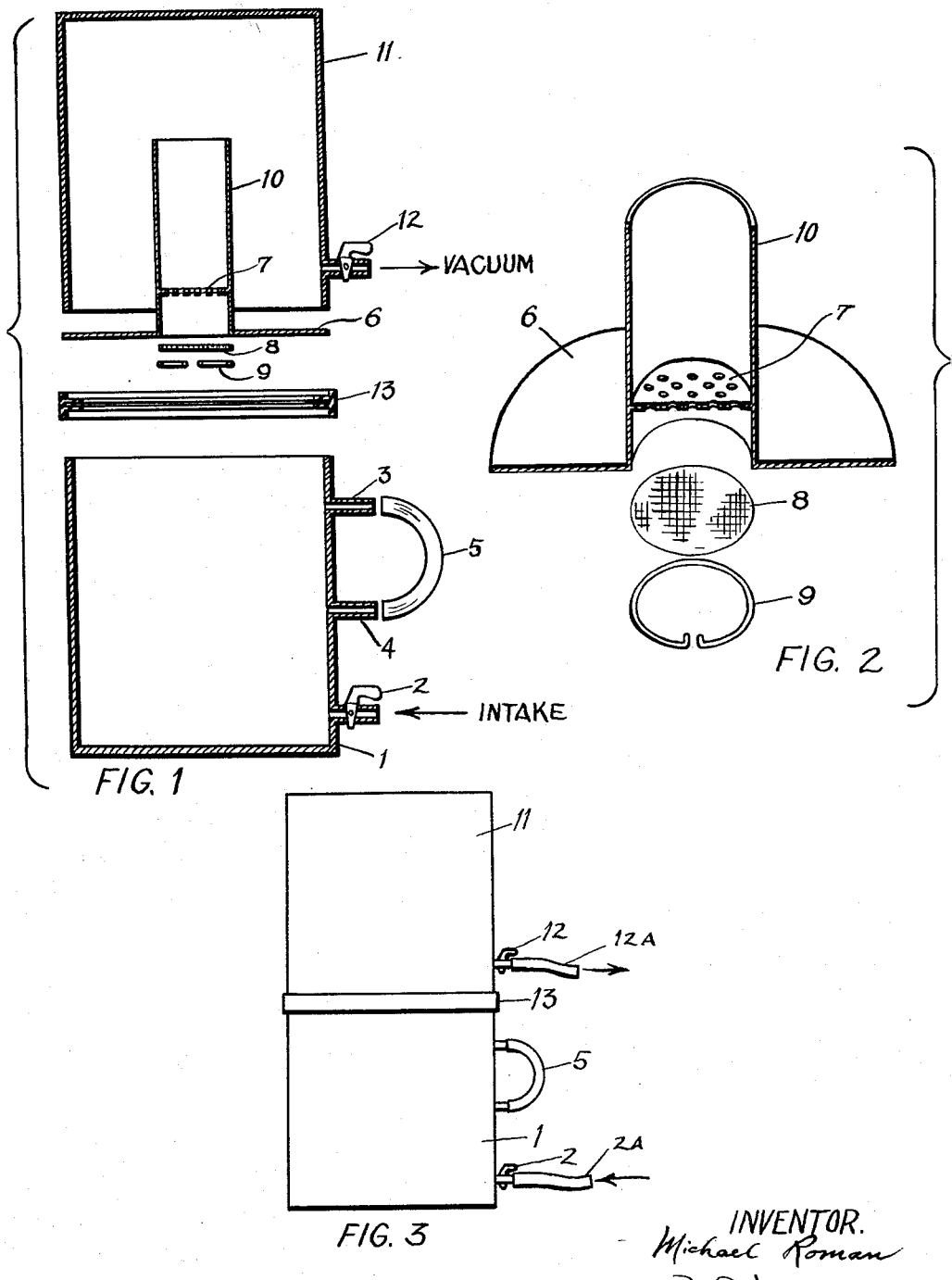
FIGURE 1 is an exploded view of the milk sampling and testing apparatus.
FIGURE 2 is a perspective view in section of the filter plate with filter disc and retainer ring shown in exploded relation.
FIGURE 3 is a side elevation of the apparatus assembled in operating relation.

In the drawings, no means is shown for heating the milk in the receiving container 1, since heating is readily accomplished by numerous ways such as by applying a thermostatically controlled electrically heated jacket wrapped around the container, or a hot water circulating jacket build around the outside of the container, or more simply, the container of milk can be set into a hot water bath for tempering, all as will readily be understood by those skilled in the art.

The invention comprises a milk receiving container 1 which embodies a milk control intake valve 2 located substantially at the bottom of the container having a flexible tube 2a through which the milk intake flows. Nipples 3 and 4 are positioned in the sides of the milk receiving container at predetermined levels such as 2 quarts and 4 quarts, or 1 gallon and 2 gallons and are interconnected with a clear plastic U tube 5 to permit observation of the volume of the sample taken for test purposes. An annular filter disc plate 6 is provided with a central milk tube 10 having a perforate partition 7 disposed so as to provide a recess to receive a milk filtering disc 8 adapted to be retained by a ring 9.

A second container 11 is provided with a vacuum control valve 12 substantially at its open rim. A gasket 13 having an internal annular groove to receive the filter plate 6 is adapted to be interposed between the open ends of the containers 1 and 11 and to form a seal therewith. A flexible tube 12a connects the vacuum control valve 12 with a source of vacuum.

The apparatus is illustrated in FIGURE 3 in assembled relation. When a vacuum is created in the assembled apparatus, milk control valve 2 is opened rapidly admitting milk into container 1 from the hose 2A, the inlet end of which is projected into a storage tank containing milk to be sampled. The amount of milk admitted as a sample is determined by observing the level of the milk in the plastic observation tube 5. After the desired amount of milk for the test sample has been admitted into container 1 the valve 2 is closed. The milk is then warmed to the desired temperature for filtering, after which the apparatus is inverted and milk delivery valve 2 is opened to admit air into container 1, the hose 2a having been disconnected or its end removed from the storage tank. Vacuum in container 11 causes the warmed milk to be drawn through the sediment testing material 8 and the milk passes through tube 10 into container 11. When passage of all of the milk has been effected, between containers 1 and 11, the supply of vacuum is cut off and the containers are separated and the sediment test disc 8 removed. The test disc is thus made available for the purpose of grading and determining the degree of cleanliness of the supply of milk tested. The milk in container 11 can then be returned to the bulk supply from which it was removed.

It can be seen that the apparatus provides for sampling by vacuum withdrawal of milk sample from the supply to be tested. The nature of the apparatus makes it possible to warm the milk by any convenient means after which the test samples of milk is drawn through the filter disc by vacuum.

The volume of milk to be tested can be correlated with the area of the sediment test disc employed, that is, the filter area can be correspondingly reduced by partial masking with a rubber shield having an opening of the proper size for the reduced volume of the sample.

The container 11 receiving the filtered milk should be larger in capacity than the volume of the sample being tested in order that the container may hold all of the tested milk without danger of overflow of the milk into the vacuum system. Tube 10 through which the filtered milk passes into the container 11 tends to direct the milk towards the bottom of the container and thereby eliminates danger of milk spray being directed toward the vacuum line.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An open ended milk testing apparatus comprising a milk receiving and measuring flat bottom container, having a valved inlet disposed near the bottom thereof, said container having a circular rim at its open end, an annular plate having a peripheral gasket seated on said rim, and an open ended flat bottom suction container disposed above said measuring container in an inverted position and having a rim at its open end seated on said gasket, said suction container having a suction line valve near the rim thereof, and a tube extending up into said suction container from the inner edge of said annular plate, said tube having a transverse perforate disc therein adjacent to but spaced from the plane of said annular plate, a filter disc disposed upon said perforate disc, and means to retain the filter disc in position.

2. A milk testing apparatus comprising an annular disc having a tubular extension extending from the inner marginal edge thereof, perforate filter disc supporting means in said tubular extension, a filter disc disposed upon said perforate disc, a gasket surrounding the outer marginal edge of said annular disc, a valved receiving and measuring container having an open end bearing in sealing relation upon said gasket, and a valved suction container having an open end bearing in sealing relation up on the other side of said gasket, said tubular extension extending into said suction container, means for evacuating both of said containers, and means for drawing milk into said measuring container by vacuum from a source of supply to be tested.

3. A milk testing apparatus comprising an annular disc having a tubular extension extending from the inner marginal edge thereof, perforate filter disc supporting means in said tubular extension, a filter disc disposed upon said perforate disc, a gasket surrounding the outer marginal edge of said annular disc, a valved receiving and measuring container having an open end bearing in sealing relation upon said gasket, said measuring container having conduit means connected to the container at spaced points for observing the liquid level therein, and a valved suction container having an open end bearing in sealing relation up on the other side of said gasket, said tubular extension extending into said suction container, means for evacuating both of said containers, and means for drawing milk into said measuring container by vacuum from a source of supply to be tested.

References Cited in the file of this patent

UNITED STATES PATENTS

| 1,052,391 | Valerius et al. | Feb. 4, 1913 |
| 1,695,306 | Wiemer | Dec. 18, 1928 |
| 2,225,984 | Erekson | Dec. 24, 1940 |

FOREIGN PATENTS

| 236,706 | Great Britain | July 16, 1925 |